United States Patent
Choudhury et al.

(10) Patent No.: US 11,487,901 B2
(45) Date of Patent: Nov. 1, 2022

(54) ANONYMIZING RELATIONAL AND TEXTUAL DATA

(71) Applicant: International Business Machines Corporation, Armonk, NY (US)

(72) Inventors: Olivia Choudhury, Cambridge, MA (US); Aris Gkoulalas-Divanis, Waltham, MA (US)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 16/809,661

(22) Filed: Mar. 5, 2020

(65) Prior Publication Data
US 2021/0279366 A1 Sep. 9, 2021

(51) Int. Cl.
*G06F 21/62* (2013.01)
*G06F 16/2457* (2019.01)
*G06F 16/28* (2019.01)

(52) U.S. Cl.
CPC .... *G06F 21/6254* (2013.01); *G06F 16/24573* (2019.01); *G06F 16/288* (2019.01); *G06F 21/6227* (2013.01); *G06F 21/6245* (2013.01)

(58) Field of Classification Search
CPC ........... G06F 21/6254; G06F 16/24573; G06F 16/288; G06F 21/6227; G06F 21/6245
See application file for complete search history.

(56) References Cited

U.S. PATENT DOCUMENTS

| | | | | |
|---|---|---|---|---|
| 8,209,342 B2* | 6/2012 | Srivastava | .......... | G06F 21/6254 707/757 |
| 9,230,132 B2* | 1/2016 | Gkoulalas-Divanis | ...................... | G06F 21/6227 |
| 10,423,803 B2 | 9/2019 | Scaiano | | |
| 10,628,608 B2* | 4/2020 | Hebert | ................ | G06F 16/2457 |
| 2008/0181396 A1* | 7/2008 | Balakrishnan | .......... | G06F 21/62 380/28 |
| 2010/0114840 A1* | 5/2010 | Srivastava | .......... | G06F 21/6254 707/E17.014 |

(Continued)

OTHER PUBLICATIONS

Desai et al., "A Data Model for Use with Formatted and Textual Data." Journal of the American Society for Information Science 37.3 (1986), 8 pages.

(Continued)

*Primary Examiner* — Cheng-Feng Huang
(74) *Attorney, Agent, or Firm* — Stephanie L. Carusillo

(57) ABSTRACT

In an approach for anonymizing data, a processor receives a mixed-type dataset with at least two relational attributes and at least one textual attribute. A processor runs the mixed-type dataset through a text annotator to discover a set of personally identifiable information (PII). A processor creates a set of ghost attributes to add to the mixed-type dataset. A processor anonymizes data of the at least two relational attributes and the set of ghost attributes. A processor replaces each PII in the textual attribute with the corresponding anonymized data in the at least two relational attributes or the set of ghost attributes to create an anonymized mixed-type dataset. A processor removes the set of ghost attributes from the anonymized mixed-type dataset. A processor shuffles records of the anonymized mixed-type dataset to create a shuffled anonymized mixed-type dataset. A processor outputs the shuffled anonymized mixed-type dataset.

20 Claims, 5 Drawing Sheets

(56) References Cited

U.S. PATENT DOCUMENTS

| | | | |
|---|---|---|---|
| 2015/0150139 A1 | 5/2015 | Pauquet | |
| 2015/0169895 A1* | 6/2015 | Gkoulalas-Divanis | ........... G06F 21/6227 726/26 |
| 2018/0165475 A1 | 6/2018 | Veeramachaneni | |
| 2021/0263971 A1* | 8/2021 | Landes | ........... G06F 16/908 |
| 2021/0303580 A1* | 9/2021 | Fries | ........... G06F 16/25 |

OTHER PUBLICATIONS

Ghinita et al., "On the Anonymization of Sparse High-Dimensional Data", 2008 IEEE 24th International Conference on Data Engineering, IEEE, 2008, 10 pages.

Li et al., "Anonymizing and Sharing Medical Text Records", Inf Syst Res. Author manuscript; available in PMC Mar. 19, 2018, Published in final edited form as: Inf Syst Res. 2017 ; 28(2): 332-352. doi:10.1287/isre.2016.0676, 47 pages.

Meystre, Stephane M., "Chapter 26 De-identification of Unstructured Clinical Data for Patient Privacy Protection", © Springer International Publishing Switzerland 2015, A. Gkoulalas-Divanis, G. Loukides (eds.), Medical Data Privacy Handbook, DOI 10.1007/978-3-319-23633-9_26, 20 pages.

Mohammed et al. "Anonymizing Healthcare Data: A Case Study on the Blood Transfusion Service", Proceedings of the 15th ACM SIGKDD international conference on Knowledge discovery and data mining, ACM, 2009, KDD'09, Jun. 28-Jul. 1, 2009, Paris, France, Copyright 2009 ACM 978-1-60558-495-9/09/06, 9 pages.

Poulis et al., "Anonymizing data with relational and transaction attributes", 2013, September, Joint European Conference on Machine Learning and Knowledge Discover in Databases, Springer, Berlin, Heidelberg, 16 pages.

Stubbs et al., "Chapter 27 Challenges in Synthesizing Surrogate PHI in Narrative EMRs", © Springer International Publishing Switzerland 2015, A. Gkoulalas-Divanis, G. Loukides (eds.), Medical Data Privacy Handbook, DOI 10.1007/978-3-319-23633-9_27, 19 pages.

Ferrovitis et al., "Privacy-preserving Anonymization of Set-valued Data", Proceedings of the VLDB Endowment 1.1 (2008), PVLDB '08, Aug. 23-28, 2008, Auckland, New Zealand, Copyright 2008 VLDB Endowment, ACM 978-1-60558-305-1/08/08, 11 pages.

Xu et al., "Anonymizing Transaction Databases for Publication", Proceedings of the 14th ACM SIG KDD International Conference on Knowledge Discovery and Data Mining, ACM, 2008, 9 pages.

\* cited by examiner

| Relational Attributes | | | Textual Attribute |
|---|---|---|---|
| Age | Gender | State | Clinical Notes |
| 35 | Male | Oregon | Steve Allen has reported obesity, fatigue, and hypertension. He is diagnosed with diabetes with neurological manifestations. He is asked to undergo bariatric surgery. |
| 42 | Female | Washington | Kate Stevens has reported weight gain, puffy face, and hair loss. She is diagnosed with thyroiditis. She is asked to undergo thyroid fine needle aspiration biopsy. |
| 67 | Female | New York | Rachel Smith is experiencing fever, chill and fatigue. She has been diagnosed with endocarditis. She has been asked to undergo pulmonary artery surgery. |
| 58 | Male | Massachusetts | John Brown is suffering from chest pain, shortness of breath, and racing heartbeat. He was diagnosed with arrhythmia. He has been recommended surgical procedures on aortic valve. |

FIG. 3

| Relational Attributes | | | Ghost Attributes | | | | Textual Attribute |
|---|---|---|---|---|---|---|---|
| Age | Gender | State | Name | Gender | ICD Code Diagnosis | CPT Code Treatment | Clinical Notes |
| 35 | Male | Oregon | Steve Allen | ▓ | 250.6 | 43999 | Steve Allen has reported obesity, fatigue, and hypertension. ▓ is diagnosed with diabetes with neurological manifestations. ▓ is asked to undergo bariatric surgery. |
| 42 | Female | Washington | Kate Stevens | ▓ | 245.4 | 60100 | Kate Stevens has reported weight gain, puffy face, and hair loss. ▓ is diagnosed with thyroiditis. ▓ is asked to undergo thyroid fine needle aspiration biopsy. |
| 67 | Female | New York | Rachel Smith | ▓ | 421 | 33935 | Rachel Smith is experiencing fever, chill and fatigue. ▓ has been diagnosed with endocarditis. ▓ has been asked to undergo pulmonary artery surgery. |
| 58 | Male | Massachusetts | John Brown | ▓ | 427.9 | 33361 | John Brown is suffering from chest pain, shortness of breath, and racing heartbeat. ▓ was diagnosed with arrhythmia. ▓ has been recommended surgical procedures on aortic valve. |

FIG. 4

| Relational Attributes | | | Ghost Attributes | | | Textual Attribute |
|---|---|---|---|---|---|---|
| Age | Gender | State | Name | ICD Code Diagnosis | CPT Code Treatment | Clinical Notes |
| [35-42] | All | US West Coast | **NAME [] | 259.8 | [10004-69990] | **NAME [] has reported swollen feet and ankles, fatigue, and hypertension. ▓▓▓ is diagnosed with endocrine disorders. ▓▓▓ is asked to undergo surgery. |
| [35-42] | All | US West Coast | **NAME [] | 259.8 | [10004-69990] | **NAME [] has reported weight gain, puffy face, and hair loss. ▓▓▓ is diagnosed with endocrine disorders. ▓▓▓ is asked to undergo surgery. |
| [58-67] | All | US East Coast | **NAME [] | 420-429 | [33010-33999] | **NAME [] is experiencing fever, chill and fatigue. ▓▓▓ has been diagnosed with other forms of heart disease. ▓▓▓ has been asked to undergo procedures on the heart and pericardium. |
| [58-67] | All | US East Coast | **NAME [] | 420-429 | [33010-33999] | **NAME [] is suffering from chest pain, shortness of breath, and racing heartbeat. ▓▓▓ was diagnosed with other forms of heart disease. ▓▓▓ has been recommended procedures on the heart and pericardium. |

FIG. 5

| Relational Attributes | | | Textual Attribute |
|---|---|---|---|
| Age | Gender | State | Clinical Notes |
| [35-42] | All | US West Coast | **NAME [] has reported weight gain, puffy face, and hair loss. He/she is diagnosed with endocrine disorders. He/she is asked to undergo surgery. |
| [35-42] | All | US West Coast | **NAME [] has reported swollen feet and ankles, fatigue, and hypertension. He/she is diagnosed with endocrine disorders. He/she is asked to undergo surgery. |
| [58-67] | All | US East Coast | **NAME [] is experiencing fever, chill and fatigue. He/she has been diagnosed with other forms of heart disease. He/she has been asked to undergo procedures on the heart and pericardium. |
| [58-67] | All | US East Coast | **NAME [] is suffering from chest pain, shortness of breath, and racing heartbeat. He/she was diagnosed with other forms of heart disease. He/she has been recommended procedures on the heart and pericardium. |

FIG. 6

ANONYMIZING RELATIONAL AND TEXTUAL DATA

BACKGROUND

The present invention relates generally to the field of data anonymization, and more particularly to anonymizing relational and textual data.

Data anonymization has been defined as a process by which personal data is irreversibly altered in such a way that a data subject can no longer be identified directly or indirectly, either by the data controller alone or in collaboration with any other party. Data anonymization enables the transfer of information across a boundary, such as between two departments within an agency or between two agencies, while reducing the risk of unintended disclosure, and in certain environments in a manner that enables evaluation and analytics post-anonymization.

In the context of medical data, anonymized data refers to data from which the patient cannot be identified by the recipient of the information. The name, address, and full postcode must be protected, together with any other information which, in conjunction with other data held by or disclosed to the recipient, could identify the patient.

SUMMARY

Aspects of an embodiment of the present invention disclose a method, computer program product, and computer system for anonymizing data. A processor receives a mixed-type dataset with at least two relational attributes and at least one textual attribute. A processor runs the mixed-type dataset through a text annotator to discover a set of personally identifiable information (PII). A processor creates a set of ghost attributes to add to the mixed-type dataset, wherein each ghost attribute of the set of ghost attributes corresponds to a PII of the set of PII discovered by the text annotator. A processor anonymizes the at least two relational attributes and the set of ghost attributes to create anonymized data for the at least two relational attributes and the set of ghost attributes. A processor replaces each PII of the set of PII in the textual attribute with the corresponding anonymized data in the at least two relational attributes or the set of ghost attributes to create an anonymized mixed-type dataset. A processor removes the set of ghost attributes from the anonymized mixed-type dataset. A processor shuffles records of the anonymized mixed-type dataset based on equivalence classes to create a shuffled anonymized mixed-type dataset. A processor outputs the shuffled anonymized mixed-type dataset.

BRIEF DESCRIPTION OF THE DRAWINGS

FIG. 3 depicts an exemplary mixed-type dataset with relational and textual attributes.

FIG. 4 depicts the exemplary mixed-type dataset showing the detection of PII in a textual attribute and the creation of corresponding ghost attributes, in accordance with an embodiment of the present invention.

FIG. 5 depicts the exemplary mixed-type dataset showing the anonymization of relational and ghost attributes and the replacement of anonymized values in the textual attribute, in accordance with an embodiment of the present invention.

FIG. 6 depicts the exemplary mixed-type dataset upon removal of the ghost attributes and shuffling of the records.

DETAILED DESCRIPTION

Figure 1:
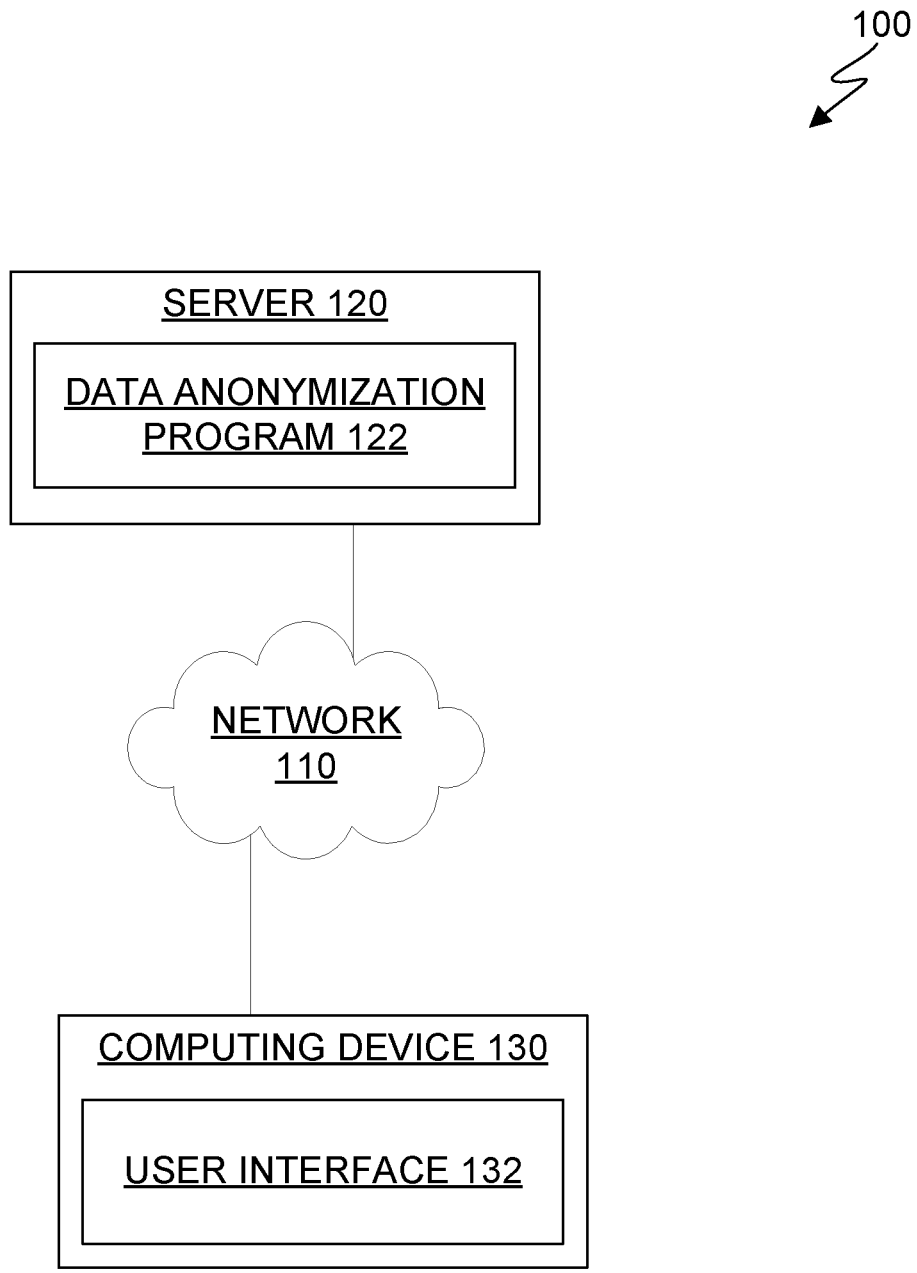
FIG. 1 depicts a block diagram of a distributed data processing environment, in accordance with an embodiment of the present invention.

Embodiments of the present invention recognize that modern person-specific datasets typically consist of multiple data types. As an example, consider electronic medical records (EMR) data, where each patient record consists of demographics (relational attributes), diagnoses and procedural codes (transaction attributes), and clinical notes (textual attribute). As another example, consider retail data involving customer purchases of products, where a record typically consists of customer demographics (relational attributes) together with a set of purchased items or products (transaction attribute). Although some mixed-type datasets are commonplace, modern data anonymization techniques are still able to operate only on datasets of a single data type, such as datasets consisting only of relational data, transaction data, user sequences, or trajectories.

Embodiments of the present invention recognize that current data anonymization techniques can only anonymize each data type individually, which leads to losing all correlations that exist between data types and results in publishing a separate dataset for each data type in order to offer privacy protection. Existing techniques for data anonymization cannot be trivially extended to operate on mixed-type data because a usual phenomenon in data anonymization is that data transformations that aim to enhance utility based on one data type tend to have the opposite effect with respect to the other data type. This phenomenon has been proven for the case of relational and transactional data co-existing in a dataset.

Embodiments of the present invention consider the specific case of mixed-type datasets that consist of a relational attribute or part and a textual attribute or part. Embodiments of the present invention provide an approach for anonymizing mixed-type datasets under privacy guarantees and utility (or information loss) bounds. Embodiments of the present invention utilize K-anonymity as the privacy model to anonymize the mixed-type datasets by augmenting K-anonymity to operate also on textual attributes. In other embodiments of the present invention, other syntactic anonymization approaches may be utilized, i.e., L-diversity, t-closeness, etc., to anonymize a mixed-type dataset.

Embodiments of the present invention take into consideration that attackers may have background knowledge consisting of a number of personal and sensitive identifiers, or personally identifiable information (PII), recorded in such mixed-type datasets, which spans different types of attributes, such as relational attributes and textual attributes. Such identifiers can be categorized as either direct identifiers or indirect/quasi-identifiers. Direct identifiers can be used alone to disclose the identity of an individual, e.g., name, social security number, phone number, etc. Indirect or quasi-identifiers are attributes that alone are not sufficient to disclose the identity of an individual but when used together they may reveal the identity of an individual, e.g., the combination of date of birth and 5-digit zip code and gender.

Embodiments of the present invention recognize that anonymizing each attribute type individually does not protect the data from attackers who have knowledge that spans relational and textual attributes, as such attackers will still be able to uncover the identity of individuals due to different ways that each attribute has been anonymized, as long as the entire record of the individual is preserved. For this reason, protection of each part individually requires splitting the original dataset into a relational dataset and a textual dataset, in which records belonging to the same individual are not linked, and anonymizing two separate datasets. Protecting each part individually breaks the correlations between the two types of attributes leading to very low data utility.

Embodiments of the present invention solve the privacy problem of, given a mixed-type dataset consisting of a number of relational attributes and a single textual attribute, computing an anonymized dataset such that the probability of an attacker, who has knowledge that spans relational and textual attributes, to accurately guess the origin of a data record from the anonymized dataset is bounded by 1/k, in which k is a user-specified parameter and is equivalent to K from K-anonymity algorithm. Embodiments of the present invention can also be applied to mixed-type datasets with multiple textual attributes by treating each textual attribute independently in the same way as the other textual attributes or by combining these textual attributes into one containing the concatenated text associated with an individual.

Embodiments of the present invention solve the privacy problem above by processing a textual attribute from a mixed-type dataset with text annotators to discover and annotate in the text of the textual attribute the various PII. Embodiments of the present invention create a ghost attribute for each discovered PII in the textual attribute, which is a relational attribute containing the corresponding PII value retrieved from the text. Embodiments of the present invention find and link any temporally correlated ghost columns and annotating them with a temporal value extracted from the textual attribute. Embodiments of the present invention discover and maintain correlations that exist between original relational attributes of the mixed-type dataset and ghost attributes extracted from the textual attribute. Embodiments of the present invention create a minimal list of quasi-identifiers. Embodiments of the present invention group together records of the mixed-type dataset based on the derived quasi-identifiers and an information/utility loss function. Embodiments of the present invention anonymize the records within each group together, the correlated attributes together, and the remaining quasi-identifiers separately. Embodiments of the present invention remove the ghost attributes from the mixed-type dataset. Embodiments of the present invention randomly shuffle the anonymized records within each equivalence class. Embodiments of the present invention output the anonymized mixed-type dataset to an end user.

Embodiments of the present invention further consider the case in which concept hierarchies exist to denote the level of generalization that is necessary to produce the K-anonymous data. Such hierarchies are not necessary when the set-based generalization model is used. Additionally, for several types of attributes such generalization hierarchies can be automatically constructed, i.e., for handling dates, ages, gender, etc.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 120 and computing device 130 interconnected over network 110. Network 110 can be, for example, a local area network (LAN), a wide area network (WAN) such as the Internet, or a combination of the two, and can include wired, wireless, or fiber optic connections. In general, network 110 can be any combination of connections and protocols that will support communications between server 120 and computing device 130. Distributed data processing environment 100 may include additional servers, computers, or other devices not shown.

Server 120 operates to run data anonymization program 122. In the depicted embodiment, server 120 houses data anonymization program 122. In some embodiments, server 120 may be a management server, a web server, or any other electronic device or computing system capable of receiving and sending data. In some embodiments, server 120 may be a laptop computer, tablet computer, netbook computer, personal computer (PC), a desktop computer, a smart phone, or any programmable electronic device capable of communicating with computing device 130 via network 110. In other embodiments, server 120 represents a server computing system utilizing multiple computers as a server system, such as in a cloud computing environment. Server 120 may include components as described in further detail in FIG. 7.

Data anonymization program 122 operates to anonymize relational and textual attributes of a mixed-type dataset of data records together. In the depicted embodiment, data anonymization program 122 resides on computing device 130. In other embodiments, data anonymization program 122 may reside on another computing device (not shown), provided that data anonymization program 122 has access to network 110. Data anonymization program 122 is described in more detail below with reference to FIG. 2.

Computing device 130 operates to send and receive datasets through a user interface. In some embodiments, computing device 130 may be, but is not limited to, an electronic device, such as a laptop computer, a tablet computer, a netbook computer, a personal computer (PC), a desktop computer, a smart phone, or any programmable electronic device capable of running user interface 132 and communicating (i.e., sending and receiving data) with server 120 and data anonymization program 122 via network 110. In some embodiments, computing device 130 represents one or more programmable electronic devices or combination of programmable electronic devices capable of executing machine readable program instructions and communicating with server 120 and/or other computing devices (not shown) within distributed data processing environment 100 via a network, such as network 110. In an embodiment, computing device 130 represents one or more devices associated with a user. In the depicted embodiment, computing device 130 includes an instance of user interface 132. Computing device 130 may include components as described in further detail in FIG. 7.

User interface 132 operates as a local user interface on computing device 130 through which a user can send and receive datasets to and from data anonymization program 122. In some embodiments, user interface 132 is a graphical user interface (GUI), a web user interface (WUI), and/or a voice user interface (VUI) that can display (i.e., visually) or present (i.e., audibly) information (such as graphics, text, and/or sound) sent from data anonymization program 122 to a user via network 110. In an embodiment, user interface 132 enables a user to send and receive data (i.e., to and from data anonymization program 122 via network 110, respectively).

Figure 2:
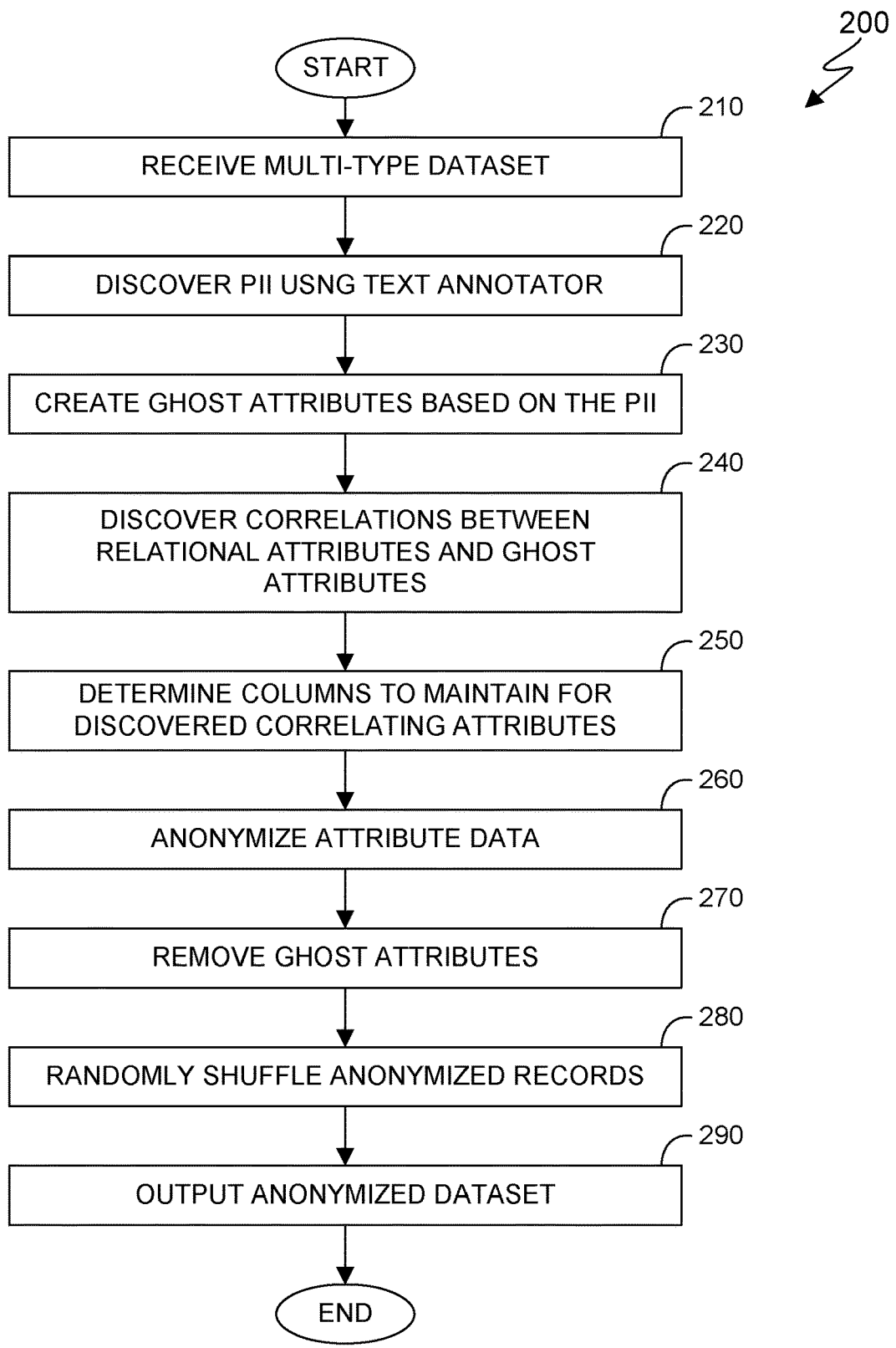
FIG. 2 depicts a flowchart of the steps of a data anonymization program, in accordance with an embodiment of the present invention.

FIG. 2 depicts a flowchart 200 of the steps of data anonymization program 122, in accordance with an embodiment of the present invention. In the depicted embodiment, data anonymization program 122 anonymizes a received mixed-type dataset using an augmented K-anonymity algorithm. It should be appreciated that the process depicted in FIG. 2 illustrates one possible iteration of data anonymization program 122, which repeats for each mixed-type dataset received by data anonymization program 122.

In step 210, data anonymization program 122 receives a mixed-type dataset. In an embodiment, data anonymization program 122 receives a mixed-type dataset with at least two relational attributes and a textual attribute for each record in the dataset. In another embodiment, data anonymization program 122 receives a mixed-type dataset with at least two relational attributes and at least two textual attributes for each record in the dataset. In an embodiment, data anonymization program 122 receives a mixed-type dataset from a user of computing device 130 through user interface 132.

In an embodiment, data anonymization program 122 receives a mixed-type data set as depicted in FIG. 3. In the embodiment depicted in FIG. 3, the mixed-type dataset is a set of medical records that include four attributes depicted as column headings with three relational attributes (age, gender, and state) and one textual attribute (clinical notes). In the embodiment depicted in FIG. 3, each row depicts an individual record with the corresponding value or text for each attribute. This same set of medical records will be used in FIGS. 4, 5, and 6 to show how an example embodiment of how data anonymization program 122 anonymizes a mixed-type dataset.

In step 220, data anonymization program 122 discovers PII using a text annotator. In an embodiment, data anonymization program 122 discovers PII within the textual attribute of the dataset using a text annotator. In an embodiment, data anonymization program 122 runs the mixed-type dataset through a text annotator that annotates the text of the dataset with text annotators, operating based on part-of-speech taggers, regular expressions, rule-based algorithms, etc., to discover the PII in the text. In an embodiment, data anonymization program 122 receives, from the text annotator, an annotated version of the mixed-type dataset, in which each PII discovered is enclosed in tags specifying the type of PII, e.g., <Name>Steve</Name>, <Gender>He</Gender>, etc. PII can include, but is not limited to, direct identifiers and indirect/quasi-identifiers. In an embodiment data anonymization program 122 uses a text annotator as known to a person of skill in the art of text anonymization and/or text de-identification, i.e., Advanced Concept Insights (ACI), Electronic Medical Record Analysis (EMRA), OpenNLP, Standford CoreNLP, SystemT, etc.

In step 230, data anonymization program 122 creates ghost attributes based on the PII. In an embodiment, data anonymization program 122 creates a ghost attribute for each identified PII in the annotated text from the textual attribute. The term ghost attribute is used to represent a temporary or stand-in attribute that is used in anonymizing the dataset and then removed before outputting the anonymized dataset. Depending on the PII discovered in the textual attribute, the ghost attribute can be of a different data type, i.e., relational attribute (e.g., name, date, age, gender, etc.), transactional attribute (e.g., diagnosis, treatment, etc.), etc. In an embodiment, data anonymization program 122 creates a ghost attribute for each identified PII in the annotated text from the textual attribute based on the tags specified by the text annotator. In an embodiment, data anonymization program 122 creates a ghost column for each ghost attribute and fills in the corresponding values for each record in the dataset. In an embodiment, data anonymization program 122 maintains a connection between the values filled in the ghost attribute columns and the actual text in the textual attribute column.

FIG. 4 depicts the same exemplary set of medical records from FIG. 3 but after step 230 has been completed. The ghost attributes in FIG. 4 are based on the PII identified within the clinical notes (or textual attribute) for each record. In the first example record (or row) in FIG. 4, the PII discovered includes "Steve Allen", "He", "diabetes with neurological manifestations", and "bariatric surgery", so data anonymization program 122 created the ghost attributes "Name", "Gender", "ICD Code Diagnosis", and "CPT Code Treatment", respectively. The corresponding PII discovered in the clinical notes and ghost attribute values are respectively color-coded in FIG. 4 to show the connection maintained between the text and the ghost attribute value in each record.

In an embodiment in which data anonymization program 122 discovers temporally related PII, data anonymization program 122 creates ghost attributes for the temporally related PII. In an example embodiment of medical records, similar to those depicted in FIG. 3, a "Clinical Notes" textual attribute for a record includes the text "if he does not get well in 3 weeks to undergo bariatric surgery". In this example, data anonymization program 122 defines the temporally related PII as having a "Duration" attribute of "3 weeks" and a "Post Event" attribute of "bariatric surgery". For this example, data anonymization program 122 creates the ghost attribute columns "Duration" and "Post Event" and put the corresponding values, which are copied and correlated with the actual text in the textual attribute, in the record under the respective columns.

Referring back to FIG. 2, in step 240, data anonymization program 122 discovers correlations between the relational attributes and the ghost attributes. In an embodiment, data anonymization program 122 discovers correlations between the original relational attributes and the ghost attributes created in step 230. In an embodiment, data anonymization program 122 discovers a correlation between a relational attribute and a ghost attribute that identify the same or essentially the same PII just at a different level of granularity. For example, data anonymization program 122 identifies that an "age" attribute correlates with a "date-of-birth" attribute, in which "date-of-birth" is a more granular level of information. In another example, data anonymization program 122 identifies that a "zip code" attribute correlates with a "state" attribute, in which "zip code" is a more granular level of information. In yet another example, data anonymization program 122 identifies that a "city" attribute correlates with a "country" attribute, in which "date-of-birth" is a more granular level of information. An example of a correlation of the same PII is shown in FIG. 4, in which FIG. 4 includes a "Gender" relational attribute and a "Gender" ghost attribute. In an embodiment, data anonymization program 122 correlates the PII identified in the textual attribute data with the relational attribute that data anonymization program 122 discovers correlates to a ghost attribute. Continuing the "Gender" attribute example in FIG. 4, data anonymization program 122 correlates the "he" and "she"

pronouns discovered in the clinical notes to the "Gender" relational attribute through the "Gender" relational attribute correlating to the "Gender" ghost attribute.

In step 250, data anonymization program 122 determines columns to maintain for correlating attributes discovered. In an embodiment, data anonymization program 122 determines whether the correlating attributes discovered in step 240 are quasi-identifiers or direct identifiers, in which data anonymization program 122 maintains only one column for any correlated quasi-identifier attributes. In an embodiment, responsive to determining that the correlating attributes identify equivalent PII, data anonymization program 122 maintains one of the respective two attributes and corresponding attribute data, and data anonymization program 122 removes a second attribute of the respective two attributes and corresponding attribute data. Thus, for example, in FIG. 4 in which a "Gender" attribute/column appears twice, data anonymization program 122 determines "Gender" is a quasi-identifier, and so data anonymization program 122 maintains only one column for the "Gender" attribute.

In an embodiment in which the correlation is between information presented at different levels of granularity, data anonymization program 122 maintains the column with the most granular information or high level of granularity and removes the column with the less granular information or lower level of granularity. In an embodiment, responsive to determining that the correlating attributes identify PII of two different levels of granularity, data anonymization program 122 maintains the attribute and corresponding attribute data that has the higher level of granularity, and data anonymization program 122 removes the attribute and corresponding attribute data that has the lower level of granularity. For example, if data anonymization program 122 in step 240 discovered correlating "age" and "date-of-birth" attributes, data anonymization program 122 maintains the "date-of-birth" attribute and column because "date-of-birth" data is more granular than "age" data.

In step 260, data anonymization program 122 anonymizes data for attributes. In an embodiment, data anonymization program 122 anonymizes data for each direct attribute and each quasi-identifier attribute. In an embodiment, data anonymization program 122 anonymizes data for each direct attribute by replacing data in each record in the ghost attribute column and the textual attribute column with a generalized name of the attribute. For example, in FIG. 5, data anonymization program 122 replaced the data in each record for the ghost "name" attribute and correlated text of the name in the clinical notes with "**NAME[ ]".

In an embodiment, data anonymization program 122 anonymizes data for each quasi-identifier by anonymizing data in each record in the quasi-identifier column and the corresponding text in the textual attribute column using partition based and/or clustering-based approaches, hierarchies, and/or an anonymization algorithm, e.g., K-anonymity algorithm and/or Mondrian algorithm, etc. In an embodiment, data anonymization program 122 uses hierarchies, i.e., a binary search tree, for each quasi-identifier attribute to select a closest or lowest common ancestor for the data in each record of a quasi-identifier attribute based on the entire set of data for that quasi-identifier attribute. In an embodiment, data anonymization program 122 anonymizes data for each quasi-identifier attribute using a binary search tree to select a closest or lowest common ancestor for each piece of data of a set of data for a respective quasi-identifier attribute based on the set of data for the respective quasi-identifier attribute. In an embodiment, data anonymization program 122 generalizes the data for each quasi-identifier attribute using the closest common ancestor.

In an embodiment, data anonymization program 122 replaces the data in the quasi-identifier attribute column (ghost attribute or original relational attribute) and in the textual attribute column with generalized data based on a closest common ancestor and/or with generalized data based on equivalence classes. For example, as seen in FIG. 5 that depicts the exemplary set of medical records from FIG. 4 but after data anonymization program 122 completes step 260, the quasi-identifier attribute "State" includes the values "US West Coast" and "US East Coast", which are the generalized values for the original data of "Oregon", "Washington", "New York", and "Massachusetts" from FIG. 4.

FIG. 5 depicts the exemplary set of medical records from FIG. 4, but after data anonymization program 122 completes step 260, showing the anonymization of relational, ghost, and textual attributes, and the replacement of anonymized values in the attributes. The quasi-identifier attributes that are generalized include "Age", "Gender", "State", "ICD Code Diagnosis", and "CPT Code Treatment".

Referring back to FIG. 2, in step 270, data anonymization program 122 removes ghost attributes. In an embodiment, data anonymization program 122 removes the ghost attribute columns, including the ghost attribute data, from the dataset.

In step 280, data anonymization program 122 randomly shuffles the anonymized records. This is to block any attempts to re-identify individuals based on the location of their record in the anonymized dataset. In an embodiment, within each equivalence class of the attributes, data anonymization program 122 randomly shuffles the records within the dataset. Shuffling of the records ensures that there is no known mapping from the original dataset to the anonymized dataset. In an embodiment, data anonymization program 122 randomly shuffles the anonymized records to produce a final anonymized dataset. FIG. 6 depicts the exemplary set of medical records upon removal of the ghost attributes and shuffling of the records.

In step 290, data anonymization program 122 outputs the anonymized dataset. In an embodiment, data anonymization program 122 outputs the anonymized dataset to another computing device. In another embodiment, data anonymization program 122 outputs the anonymized dataset to a user through user interface 132 of computing device 130.

Figure 7:
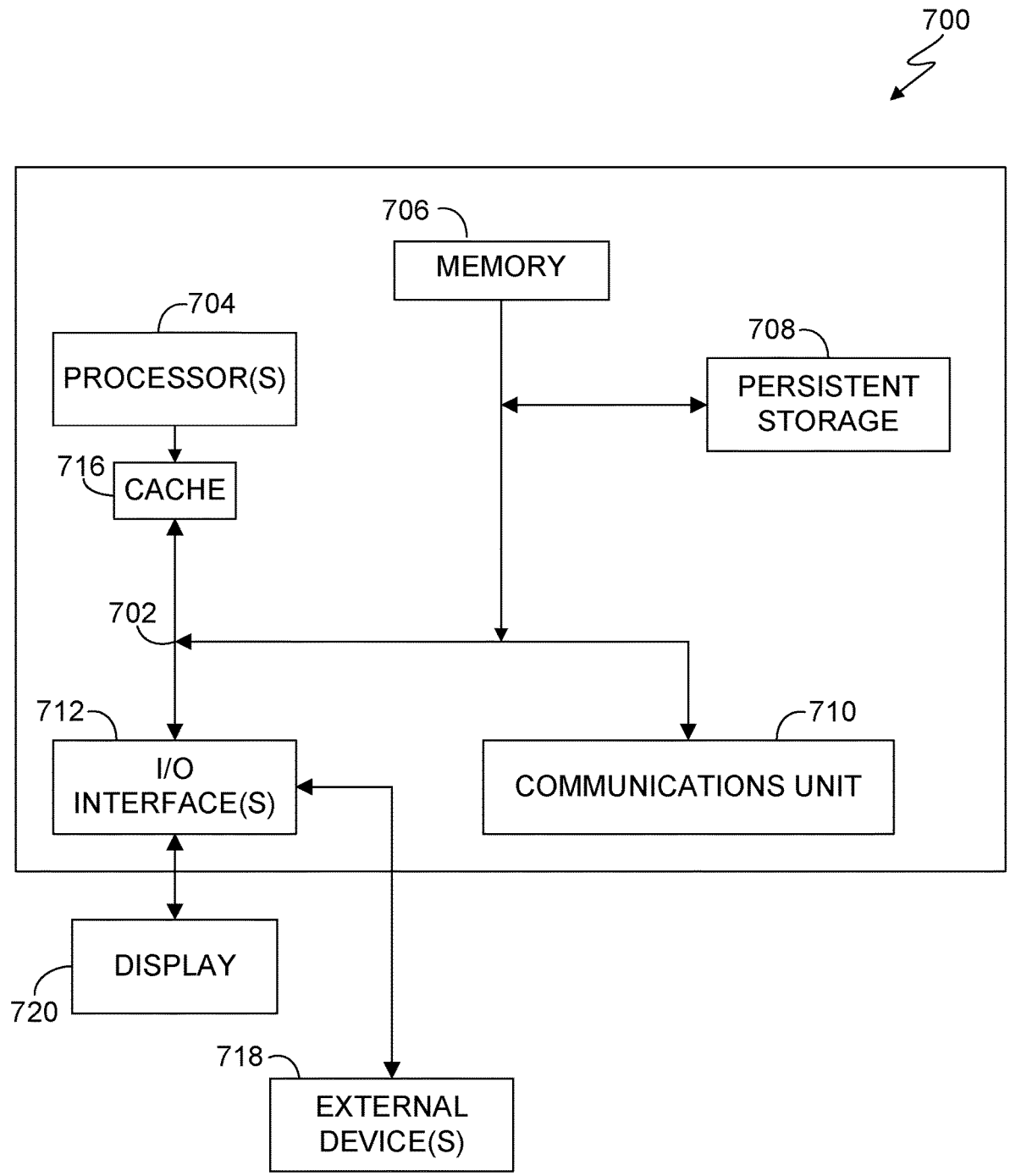
FIG. 7 depicts a block diagram of a computer of distributed data processing environment, in accordance with an embodiment of the present invention.

FIG. 7 depicts a block diagram of computer 700 suitable for server 120 and/or computing device 130, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computer 700 includes communications fabric 702, which provides communications between cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

Programs may be stored in persistent storage 708 and in memory 706 for execution and/or access by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Programs may be downloaded to persistent storage 708 through communications unit 710.

I/O interface(s) 712 allows for input and output of data with other devices that may be connected to server 120. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for anonymizing data, the computer-implemented method comprising:
   receiving, by one or more processors, a mixed-type dataset with at least two relational attributes and at least one textual attribute;
   running, by one or more processors, text of the at least one textual attribute of the mixed-type dataset through a text annotator to discover a set of personally identifiable information (PII) that produces an annotated textual attribute with each PII enclosed in tags specifying a respective type of PII;
   creating, by one or more processors, a set of ghost attributes to add to the mixed-type dataset, wherein each ghost attribute of the set of ghost attributes corresponds to one type of PII of the set of PII discovered by the text annotator;
   anonymizing, by one or more processors, data of the at least two relational attributes and the set of ghost attributes based on whether a respective attribute is a direct identifier of PII or a quasi-identifier of PII;
   replacing, by one or more processors, each PII of the set of PII in the textual attribute with the corresponding anonymized data from the at least two relational attributes or the set of ghost attributes to create an anonymized mixed-type dataset;
   removing, by one or more processors, the set of ghost attributes from the anonymized mixed-type dataset;
   shuffling, by one or more processors, records of the anonymized mixed-type dataset based on equivalence classes to create a shuffled anonymized mixed-type dataset; and
   outputting, by one or more processors, the shuffled anonymized mixed-type dataset.

2. The computer-implemented method of claim 1, further comprising:
   determining, by one or more processors, that a relational attribute of the at least two relational attributes and a ghost attribute of the set of ghost attributes identify equivalent PII or PII of two different levels of granularity.

3. The computer-implemented method of claim 2, further comprising:
   responsive to determining that the relational attribute of the at least two relational attributes and the ghost attribute of the set of ghost attributes identify equivalent PII, maintaining, by one or more processors, one of the respective two attributes and corresponding attribute data; and
   removing, by one or more processors, a second attribute of the respective two attributes and corresponding attribute data.

4. The computer-implemented method of claim 2, further comprising:
   responsive to determining that the relational attribute of the at least two relational attributes and the ghost attribute of the set of ghost attributes identify PII of two different levels of granularity, maintaining, by one or more processors, a first attribute of the respective two attributes and corresponding attribute data that has a higher level of granularity; and
   removing, by one or more processors, a second attribute of the respective two attributes and corresponding attribute data that has a lower level of granularity.

5. The computer-implemented method of claim 1, wherein anonymizing the data of the at least two relational attributes and the set of ghost attributes based on whether the respective attribute is a direct identifier of PII or a quasi-identifier of PII comprises:
   for each respective attribute of the at least two relational attributes and the set of ghost attributes that are quasi-identifiers of PII, using, by one or more processors, K-anonymity algorithm to anonymize the data.

6. The computer-implemented method of claim 1, wherein anonymizing the data of the at least two relational attributes and the set of ghost attributes based on whether the respective attribute is a direct identifier of PII or a quasi-identifier of PII comprises:
for each respective attribute of the at least two relational attributes and the set of ghost attributes that are quasi-identifiers of PII, anonymizing, by one or more processors, respective data using a binary search tree to select a closest or lowest common ancestor for each piece of data of the respective data.

7. The computer-implemented method of claim 1, wherein anonymizing the data of the at least two relational attributes and the set of ghost attributes based on whether the respective attribute is a direct identifier of PII or a quasi-identifier of PII comprises:
for each respective attribute of the at least two relational attributes and the set of ghost attributes that are direct identifiers of PII, anonymizing, by one or more processors, respective data by replacing each piece of data of the respective data with a generalized name of the respective attribute.

8. A computer program product for anonymizing data, the computer program product comprising:
one or more computer readable storage media and program instructions stored on the one or more computer readable storage media, the program instructions comprising:
program instructions to receive a mixed-type dataset with at least two relational attributes and at least one textual attribute;
program instructions to run text of the at least one textual attribute of the mixed-type dataset through a text annotator to discover a set of personally identifiable information (PII) that produces an annotated textual attribute with each PII enclosed in tags specifying a respective type of PII;
program instructions to create a set of ghost attributes to add to the mixed-type dataset, wherein each ghost attribute of the set of ghost attributes corresponds to one type of PII of the set of PII discovered by the text annotator;
program instructions to anonymize data of the at least two relational attributes and the set of ghost attributes based on whether a respective attribute is a direct identifier of PII or a quasi-identifier of PII;
program instructions to replace each PII of the set of PII in the textual attribute with the corresponding anonymized data from the at least two relational attributes or the set of ghost attributes to create an anonymized mixed-type dataset;
program instructions to remove the set of ghost attributes from the anonymized mixed-type dataset;
program instructions to shuffle records of the anonymized mixed-type dataset based on equivalence classes to create a shuffled anonymized mixed-type dataset; and
program instructions to output the shuffled anonymized mixed-type dataset.

9. The computer program product of claim 8, further comprising:
program instructions to determine that a relational attribute of the at least two relational attributes and a ghost attribute of the set of ghost attributes identify equivalent PII or PII of two different levels of granularity.

10. The computer program product of claim 9, further comprising:
responsive to determining that the relational attribute of the at least two relational attributes and the ghost attribute of the set of ghost attributes identify equivalent PII, program instructions to maintain a first attribute of the respective two attributes and corresponding attribute data; and
program instructions to remove a second attribute of the respective two attributes and corresponding attribute data.

11. The computer program product of claim 9, further comprising:
responsive to determining that the relational attribute of the at least two relational attributes and a ghost attribute of the set of ghost attributes identify PII of two different levels of granularity, program instructions to maintain a first attribute of the respective two attributes and corresponding attribute data that has a higher level of granularity; and
program instructions to remove a second attribute of the respective two attributes and corresponding attribute data that has a lower level of granularity.

12. The computer program product of claim 8, wherein the program instructions to anonymize the data of the at least two relational attributes and the set of ghost attributes based on whether the respective attribute is a direct identifier of PII or a quasi-identifier of PII comprise:
for each respective attribute of the at least two relational attributes and the set of ghost attributes that are quasi-identifiers of PII, program instructions to use K-anonymity algorithm to anonymize the data.

13. The computer program product of claim 8, wherein the program instructions to anonymize the data of the at least two relational attributes and the set of ghost attributes based on whether the respective attribute is a direct identifier of PII or a quasi-identifier of PII comprises:
for each respective attribute of the at least two relational attributes and the set of ghost attributes that are quasi-identifiers of PII, program instructions to anonymize respective data using a binary search tree to select a closest or lowest common ancestor for each piece of data of the respective data.

14. The computer program product of claim 8, wherein the program instructions to anonymize the data of the at least two relational attributes and the set of ghost attributes based on whether the respective attribute is a direct identifier of PII or a quasi-identifier of PII comprises:
for each respective attribute of the at least two relational attributes and the set of ghost attributes that are direct identifiers of PII, program instructions to anonymize respective data by replacing each piece of data of the respective data with a generalized name of the respective attribute.

15. A computer system for anonymizing data, the computer system comprising:
one or more computer processors;
one or more computer readable storage media;
program instructions stored on the computer readable storage media for execution by at least one of the one or more processors, the program instructions comprising:
program instructions to receive a mixed-type dataset with at least two relational attributes and at least one textual attribute;
program instructions to run text of the at least one textual attribute of the mixed-type dataset through a text annotator to discover a set of personally identifiable information (PII) that produces an annotated textual attribute with each PII enclosed in tags specifying a respective type of PII;

program instructions to create a set of ghost attributes to add to the mixed-type dataset, wherein each ghost attribute of the set of ghost attributes corresponds to one type of PII of the set of PII discovered by the text annotator;

program instructions to anonymize data of the at least two relational attributes and the set of ghost attributes based on whether a respective attribute is a direct identifier of PII or a quasi-identifier of PII;

program instructions to replace each PII of the set of PII in the textual attribute with the corresponding anonymized data from the at least two relational attributes or the set of ghost attributes to create an anonymized mixed-type dataset;

program instructions to remove the set of ghost attributes from the anonymized mixed-type dataset;

program instructions to shuffle records of the anonymized mixed-type dataset based on equivalence classes to create a shuffled anonymized mixed-type dataset; and program instructions to output the shuffled anonymized mixed-type dataset.

16. The computer system of claim 15, further comprising:
program instructions to determine that a relational attribute of the at least two relational attributes and a ghost attribute of the set of ghost attributes identify equivalent PII or PII of two different levels of granularity.

17. The computer system of claim 16, further comprising:
responsive to determining that the relational attribute of the at least two relational attributes and the ghost attribute of the set of ghost attributes identify equivalent PII, program instructions to maintain a first attribute of the respective two attributes and corresponding attribute data; and program instructions to remove a second attribute of the respective two attributes and corresponding attribute data.

18. The computer system of claim 16, further comprising:
responsive to determining that the relational attribute of the at least two relational attributes and a ghost attribute of the set of ghost attributes identify PII of two different levels of granularity, program instructions to maintain a first attribute of the respective two attributes and corresponding attribute data that has a higher level of granularity; and program instructions to remove a second attribute of the respective two attributes and corresponding attribute data that has a lower level of granularity.

19. The computer system of claim 15, wherein the program instructions to anonymize the data of the at least two relational attributes and the set of ghost attributes based on whether the respective attribute is a direct identifier of PII or a quasi-identifier of PII comprise:
for each respective attribute of the at least two relational attributes and the set of ghost attributes that are quasi-identifiers of PII, program instructions to use K-anonymity algorithm to anonymize the data.

20. The computer system of claim 15, wherein the program instructions to anonymize the data of the at least two relational attributes and the set of ghost attributes based on whether the respective attribute is a direct identifier of PII or a quasi-identifier of PII comprises:
for each respective attribute of the at least two relational attributes and the set of ghost attributes that are quasi-identifiers of PII, program instructions to anonymize respective data using a binary search tree to select a closest or lowest common ancestor for each piece of data of the respective data.

* * * * *